H. N. OTT & K. LEUCHSENRING.
MICROSCOPE.
APPLICATION FILED SEPT. 25, 1913.
1,149,401.
Patented Aug. 10, 1915.
2 SHEETS—SHEET 1.
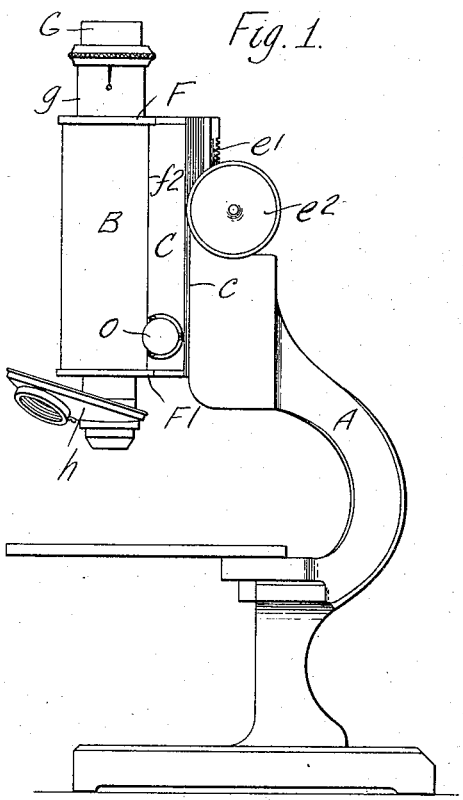
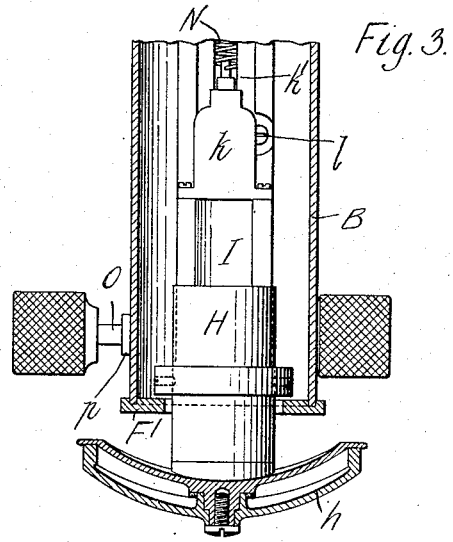
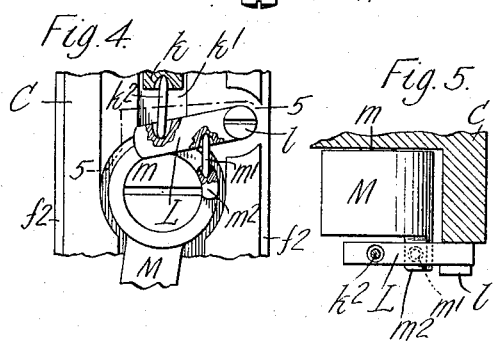
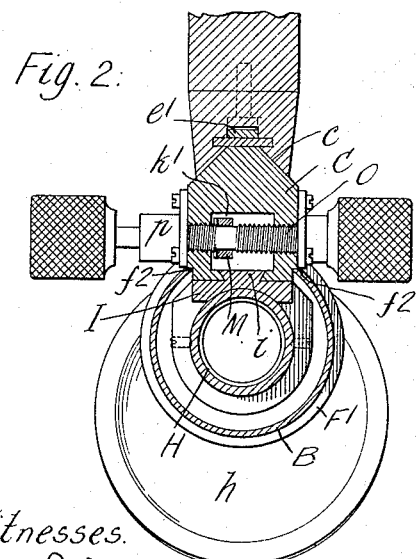
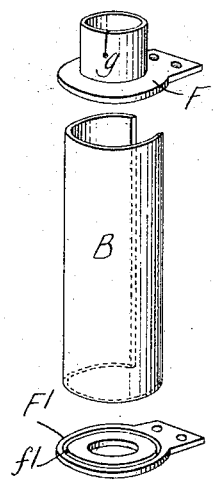
Witnesses.
Inventors.
Harvey N. Ott
Konrad Leuchsenring
by Wilhelm Porkes & Hard Attorneys.

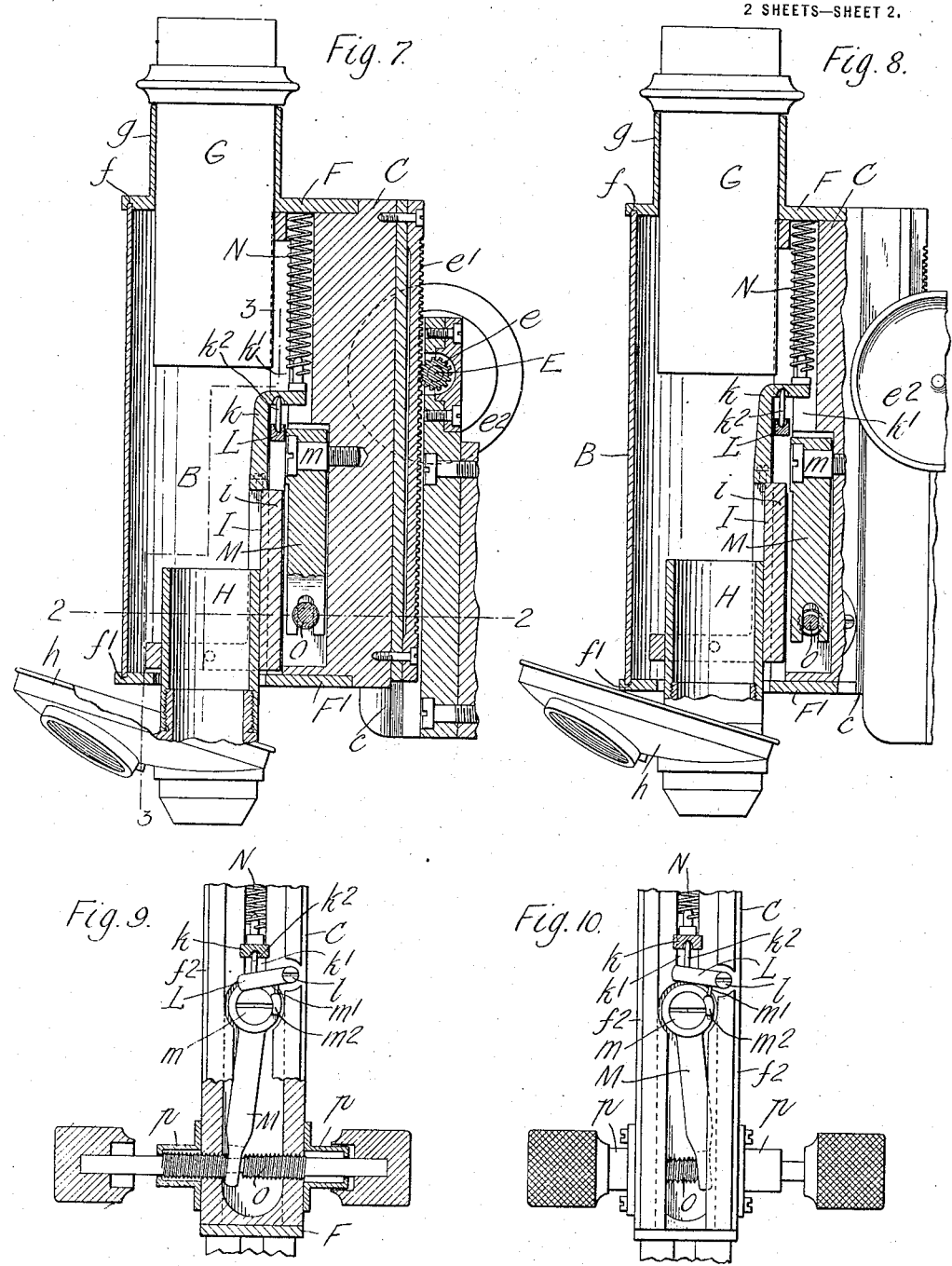

UNITED STATES PATENT OFFICE.

HARVEY N. OTT AND KONRAD LEUCHSENRING, OF BUFFALO, NEW YORK, ASSIGNORS TO SPENCER LENS COMPANY, OF BUFFALO, NEW YORK.

MICROSCOPE.

1,149,401.  Specification of Letters Patent.  Patented Aug. 10, 1915.

Application filed September 25, 1913. Serial No. 791,845.

*To all whom it may concern:*

Be it known that we, HARVEY N. OTT and KONRAD LEUCHSENRING, citizens of the United States, residing at Buffalo, in the county of Erie and State of New York, have invented a new and useful Improvement in Microscopes, of which the following is a specification.

This invention relates to microscopes and more particularly to improvements in the fine adjustment mechanism and in the lens tube construction of microscopes.

The objects of the invention as to produce an efficient and desirable fine adjustment of strong and durable but simple construction which is operated by one or more handles or knobs conveniently located at the side or sides of the lens tube; also to produce a construction in which the fine adjustment does not move the entire lens tube but only the objective carrier, so that the adjusting mechanism is relieved from the weight of the lens tube and parts carried thereby, thus greatly reducing the wear on the mechanism; also to arrange the mechanism of the fine adjustment so that it will produce the required excursion of the adjustable part, but will occupy the minimum space and will apply the thrust on the part moved directly in the line of motion and without lateral thrust; also to construct and connect the lens tube to its supporting slide in such a way as to materially reduce the cost of manufacture of the microscope without in any wise lessening the efficiency of the instrument; also to improve microscopes in the other respects hereinafter described and set forth in the claims.

In the accompanying drawings: Figure 1 is a side elevation on a reduced scale of a microscope embodying the invention. Fig. 2 is a horizontal section, partly in plan thereof, in line 2—2, Fig. 7. Fig. 3 is a fragmentary transverse sectional elevation thereof in line 3—3, Fig. 7. Fig. 4 is a fragmentary front elevation, partly in section, on an enlarged scale, of the fine adjustment mechanism. Fig. 5 is a plan view partly in section in line 5—5, Fig. 4. Fig. 6 is a perspective view of the parts of the lens tube detached, on a reduced scale. Fig. 7 is a fragmentary longitudinal sectional elevation of the microscope showing the lowered position of the objective. Fig. 8 is a similar view showing the objective raised. Figs. 9 and 10 are front elevations, partly in section, of the fine adjustment mechanism, respectively, showing the two positions indicated in Figs. 7 and 8.

Like reference characters refer to like parts in the several figures.

A represents the usual tube supporting arm of a microscope stand; B the lens tube; C the slide which carriers the lens tube and which is adjustable vertically on the arm A toward and from the stage by the coarse adjustment.

The tube slide C shown is provided at its rear with a guide portion which is confined and arranged to slide in a vertical guideway $c$ on the upright front portion of the arm A, and is adjusted vertically by the usual horizontal cross shaft E which is journaled on the arm A and is provided with a pinion $e$ meshing with a toothed rack $e'$ on the back of the tube slide. The coarse adjustment shaft E is turned by the usual wheels or knobs $e^2$ thereon at opposite sides of the arm A. By turning this coarse adjustment shaft, the tube slide C and the lens tube B, together with the parts carried thereby, are adapted to be adjusted vertically relative to the stage. While this construction is preferred the tube slide can be slidably mounted and adjusted in any other suitable way.

The lens tube B preferably consists of a segmental or open-sided tubular shell, see Fig. 6, which is confined and held between upper and lower horizontal plates or brackets F and F' which are secured by screws, or otherwise, respectively, to the upper and lower ends of the tube slide C and project forwardly therefrom. The upper end of the shell is confined in a circular groove $f$ in the under side of the upper bracket F, and the lower end of the shell is similarly seated in a circular groove $f'$ in the upper face of the lower bracket F'. The longitudinal edges of the shell are seated in vertical grooves or rabbets $f^2$ at the opposite sides of the front portion of the tube slide C. The tubular shell is thus held securely and rigidly in place and has the same appearance and serves the same purpose as the seamless tube heretofore used which is soldered on the front of the tube slide. The segmental shell, however, is much less expensive, as it can be made from a cheaper seamed tube, or can be rolled into form from a sheet metal blank without waste of material. Since the shell is separate from the tube slide, it enables the ready assembling of the fine adjustment mechanism presently described, and it can be readily detached to give access to this mechanism.

The upper bracket F is provided with a vertical tubular guide extension $g$ in which a tube G that carries the eye-piece is adapted to slide vertically, thus permitting the usual adjustment of the eye-piece in the lens tube toward and from the objective. This guide extension $g$ is preferably split so that it grips the eye-piece tube G with a spring pressure and acts to support the eye-piece tube in any position to which it may be moved.

H represents a tube which carries the objective or the adjustable nose-piece $h$ for the objectives when a plurality of different objectives are used. The nose-piece or the single objective, whichever is used, is preferably removably screwed on the lower end of the objective tube H. The tube H extends into the lens tube through an opening in the lower bracket F' and is mounted to slide vertically on the front of the tube slide C. Preferably the objective tube H is secured in a horizontal ring at the lower end of a slide I which is provided with a dove-tailed vertical guide rib $i$ on its rear side arranged to slide in a correspondingly shaped vertical guide-way in the lower front portion of the tube slide C. The objective tube H with the objective or the nose-piece and objectives carried thereby is thus adapted to be adjusted vertically relative to the lens tube B and its slide, and these are the only parts which are moved by the fine adjustment mechanism. The weight of the parts moved by the fine adjustment mechanism is, therefore, very much less than in prior constructions in which the lens tube or the lens tube slide and the parts mounted thereon are moved by the fine adjustment, and consequently the wear on the adjusting mechanism is greatly reduced. The fine adjustment mechanism for thus adjusting the objective tube H is preferably constructed as follows: The objective tube slide I is provided at its upper end with a lug or part $k$ which projects rearwardly therefrom into a vertical chamber $k'$ in the front of the tube slide C and is supported by a lever L which is suitably fulcrumed at $l$ on the tube slide C and extends crosswise thereof in said chamber $k'$ in rear of the objective slide I. The lug $k$ preferably hangs on a loose bearing pin $k^2$ which is seated at its ends in sockets in the lug $k$ and in the lever L. The lever L in turn bears on a lever M which is suitably fulcrumed at or near its upper end, for example, on a screw $m$ projecting from the tube slide C, and hangs therefrom in the chamber $k'$ in the tube slide. The lever L preferably bears on a loose pin $m'$ which is seated in sockets in the lever L and in a lug $m^2$ which projects forwardly from the lever M at one side of its fulcrum beneath the lever L. The lever M is adapted to swing crosswise of the tube slide and by swinging its lower end in one direction the lever L and the objective slide resting thereon are moved upwardly. A spring N preferably arranged vertically in a recess of the tube slide C and bearing at its upper end against the upper tube bracket F and at its lower end against the lug $k$ of the objective slide H presses downwardly on the objective slide and lowers the slide when the lower end of the lever M is moved in the opposite direction. This spring also serves to hold the lug $k$ of the objective slide in place on its bearing pin and to retain this bearing pin and the bearing pin between the levers L and M in their respective sockets. The objective slide is thus raised when the lower end of the lever M is swung in one direction and is lowered when the lower end of the lever M is moved in the opposite direction.

O represents a screw shaft for operating the lever M. This shaft extends transversely through the lower portion of the tube slide C and is provided with threaded portions working in screw threaded holes in the opposite sides of the tube slide and is provided at its opposite ends with knurled heads for turning it. The lower end of the lever M is connected to the screw shaft so that when the shaft is turned the endwise movement thereof due to its screw engagement with the tube slide causes a corresponding movement of the lower end of the lever M in one direction or the other, depending upon the direction of rotation of the screw shaft. As shown the lower end of the lever M is forked and straddles a reduced central portion of the screw shaft O. The lever could be differently connected to the screw shaft O, or it could be moved by any other suitable screw or other operating device. The tube slide C is preferably provided at its opposite sides with tubular housings $p$ which surround the screw shaft O and hide and protect the thread on the latter. The knobs or heads on the ends of the screw shaft are preferably recessed for the entrance of the housings $p$, as thereby the necessary endwise movement is secured with a shorter shaft than would otherwise be necessary.

By constructing and arranging the fine adjustment mechanism as described it is relieved of the weight of all parts of the microscope, except the small light tube H and the parts connected thereto. By employing the levers L and M, arranged as shown and described, they occupy but little room transversely and fore and aft of the instrument and can be housed within the tube slide without necessitating an objectionable increase in the dimensions of the latter. The compound leverage gives the necessary excursion of the objective and permits the required micrometer adjustment thereof with a relatively coarse strong thread on the screw shaft O. This arrangement also applies the force to the objective slide substantially in the line of movement of the guide rib for the slide, the lever L being located substantially in the same vertical plane with said guide for this purpose. There is, therefore, no lateral thrust on the slide and no tendency to cause it to bind in its guide-way.

We claim as our invention:

1. In a microscope, the combination with a stand, a slide adjustable on said stand, and a lens tube, of an objective carrier which is adjustable relative to the lens tube, and a fine adjustment mechanism for adjusting said objective carrier independently of said lens tube comprising an operating handle arranged at one side of said stand, and means inclosed by the lens tube and said slide for transmitting motion from said handle to said objective carrier, substantially as set forth.

2. In a microscope, the combination with a stand, a lens tube slidably mounted on the stand, and coarse adjustment means for said lens tube, of an objective carrier which is adjustable relatively to the lens tube, and a fine adjustment mechanism which is operatively connected with said objective carrier for adjusting the same relatively to said lens tube and which is inclosed in a position between said lens tube and said coarse adjusting means.

3. In a microscope, the combination with a stand, a lens tube slidably mounted on the stand, and coarse adjustment means for said lens tube, of an objective carrier which is adjustable relatively to the lens tube, a fine adjustment mechanism which is operatively connected with said objective carrier for adjusting the same relatively to said lens tube, and an operating shaft for said fine adjusting mechanism extending transversely of the microscope in a plane between the lens tube and the coarse adjusting means.

4. In a microscope, the combination with a stand, a lens tube, a slide located between the lens tube and the stand and on which the lens tube is mounted, and coarse adjustment means for said lens tube, of an objective carrier which is adjustable axially in said lens tube, and fine adjustment mechanism located in said slide for adjusting said objective carrier independently of the lens tube, substantially as set forth.

5. In a microscope, the combination with a stand, a lens tube, a slide located between the lens tube and the stand and on which the lens tube is mounted, and coarse adjustment means for said lens tube, of an objective carrier which is adjustable axially in said lens tube, fine adjustment mechanism for said objective carrier located in said slide, and connections between said objective carrier and said fine adjustment mechanism extending through the rear side of the lens tube, substantially as set forth.

6. In a microscope, the combination with a stand, a lens tube, a slide located between the lens tube and the stand and on which the lens tube is mounted, and coarse adjustment means for said lens tube, of fine adjustment mechanism for the microscope objective comprising a horizontal operating shaft passing through said slide between the lens tube and the stand, and levers also located in said slide between the lens tube and the stand for transmitting the adjusting movement of said operating shaft, substantially as set forth.

7. In a microscope, the combination with a stand, a lens tube, and coarse adjustment means for said lens tube, of an objective carrier movable axially in the lens tube, fine adjustment mechanism for moving said objective carrier comprising a horizontal screw shaft extending crosswise of the lens tube in rear thereof, an upright lever which is moved transversely of the instrument by said screw shaft, and a second lever which extends crosswise of the instrument and transmits the motion of said first lever to the adjustable part, substantially as set forth.

8. In a microscope, the combination with a stand, a lens tube having a longitudinal opening in its rear side, and coarse adjustment means for said lens tube, of an objective carrier movable axially in said lens tube, fine adjustment mechanism comprising a horizontal screw shaft extending crosswise of said lens tube in rear thereof, an upright lever which is moved transversely of the instrument by said screw shaft, a second lever which extends substantially transversely of the instrument and is moved by said first lever, and a part connected to said objective carrier which projects through said opening in the lens tube and is supported by said second lever, substantially as set forth.

9. In a microscope, the combination with a stand, and a lens tube slide movable on said stand, of a segmental cylindrical lens tube which is mounted on said slide and has an open rear side which is closed by said slide, and adjustment mechanism for the microscope objective mounted on said slide and having a part extending through said open rear side of the lens tube, substantially as set forth.

10. In a microscope, a lens tube consisting of a segmental cylindrical shell having an open rear side, and a part on which said shell is mounted and which closes said open rear side, substantially as set forth.

11. In a microscope, a lens tube consisting of a segmental cylindrical shell having an open rear side, a part against which the longitudinal edges of said shell abut and which closes said open rear side, and upper and lower brackets secured to said part and between which said shell is secured, substantially as set forth.

Witness our hands, this 23rd day of September, 1913.

HARVEY N. OTT.
KONRAD LEUCHSENRING.

Witnesses:
　LOUIS M. POTTER,
　CORA FACKLAM.

Copies of this patent may be obtained for five cents each, by addressing the " Commissioner of Patents, Washington, D. C."